(12) United States Patent
Wang

(10) Patent No.: US 7,028,984 B2
(45) Date of Patent: Apr. 18, 2006

(54) FLOW CONTROL VALVE FOR GARDENING PIPE

(76) Inventor: Hsin-Fa Wang, 68, Mou Tan Lane, Shao An Li, Lu Kang Town, Chang Hua Hsien (TW)

( * ) Notice: Subject to any disclaimer, the term of this patent is extended or adjusted under 35 U.S.C. 154(b) by 0 days.

(21) Appl. No.: 10/841,310

(22) Filed: May 7, 2004

(65) Prior Publication Data

US 2005/0247901 A1    Nov. 10, 2005

(51) Int. Cl.
*F16K 5/10* (2006.01)

(52) U.S. Cl. .................................. 251/206; 251/286
(58) Field of Classification Search ............... 251/205, 251/206, 208, 286, 304
See application file for complete search history.

(56) References Cited

U.S. PATENT DOCUMENTS

| | | | | |
|---|---|---|---|---|
| 934,932 A | * | 9/1909 | Osbourn | 251/206 |
| 935,329 A | * | 9/1909 | Serrell et al. | 251/206 |
| 2,510,356 A | * | 6/1950 | Werts | 137/454.2 |
| 5,485,983 A | * | 1/1996 | Voege et al. | 251/206 |
| 5,871,032 A | * | 2/1999 | Ko | 137/625.47 |
| 6,305,357 B1 | * | 10/2001 | Soukeras | 123/495 |

* cited by examiner

*Primary Examiner*—Edward K. Look
*Assistant Examiner*—John K. Fristoe, Jr.
(74) *Attorney, Agent, or Firm*—Egbert Law Offices

(57) ABSTRACT

A flow control valve for a gardening pipe includes a main body, a control member, a rotation knob, and a bottom cap. Thus, the flow control valve has a simplified construction and is made easily, thereby decreasing costs of fabrication. In addition, the water flow rate of the flow control valve is controlled exactly by provision of the water outlet holes having different sizes, thereby facilitating a user operating and controlling the water output the flow control valve.

13 Claims, 4 Drawing Sheets

US 7,028,984 B2

FLOW CONTROL VALVE FOR GARDENING PIPE

BACKGROUND OF THE INVENTION

1. Field of the Invention

The present invention relates to a flow control valve, and more particularly to a flow control valve for a gardening pipe.

2. Description of the Related Art

A conventional flow control valve for a gardening pipe comprises a main body having a first end formed with a water inlet tube connected to a water source and a second end formed with a water outlet tube connected to a sprinkler (not shown) or the like, and a control handle pivotally mounted on the main body. However, the water flow passing through the flow control valve is controlled by rotation of the control handle which cannot regulate the water flow rate of the flow control valve exactly, so that the water output of the flow control valve easily exceeds the practical requirement, thereby causing water consumption, and thereby causing inconvenience to a user in regulating and adjusting the water flow rate of the flow control valve.

The closest prior art of which the applicant is aware is disclosed in the Taiwanese Patent Publication No. 528135, entitled by "FLOW CONTROL VALVE FOR PIPE".

SUMMARY OF THE INVENTION

In accordance with the present invention, there is provided a flow control valve, comprising:

a main body having a first end formed with a water inlet tube, a second end formed with a water outlet tube, and a mediate portion formed with a valve chamber having a first end formed with a water inlet communicating with the water inlet tube and a second end formed with a water outlet communicating with the water outlet tube;

a control member rotatably mounted in the main body and including a control plate rotatably mounted in the valve chamber of the main body, and a control rod having a first end mounted on the control plate and a second end extended through the mediate portion of the main body, the control plate of the control member having a periphery formed with a plurality of water outlet holes and a closed water stop portion which are movable to align with the water inlet of the valve chamber of the main body; and a rotation knob rotatably mounted on the main body and secured on the control member for rotating the control member.

The primary objective of the present invention is to provide a flow control valve for a gardening pipe.

Another objective of the present invention is to provide a flow control valve having a simplified construction and is made easily, thereby decreasing costs of fabrication.

A further objective of the present invention is to provide a flow control valve, wherein the water flow rate of the flow control valve is controlled exactly by provision of the water outlet holes having different sizes, thereby facilitating a user operating and controlling the water output the flow control valve.

Further benefits and advantages of the present invention will become apparent after a careful reading of the detailed description with appropriate reference to the accompanying drawings.

DETAILED DESCRIPTION OF THE INVENTION

Figure 3:
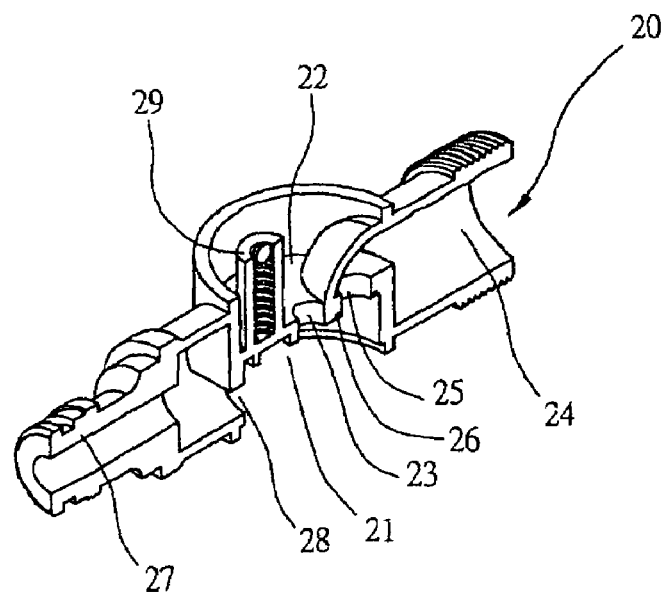
FIG. 3 is a partially cut-away perspective view of the flow control valve as shown in FIG. 1.
Figure 1:
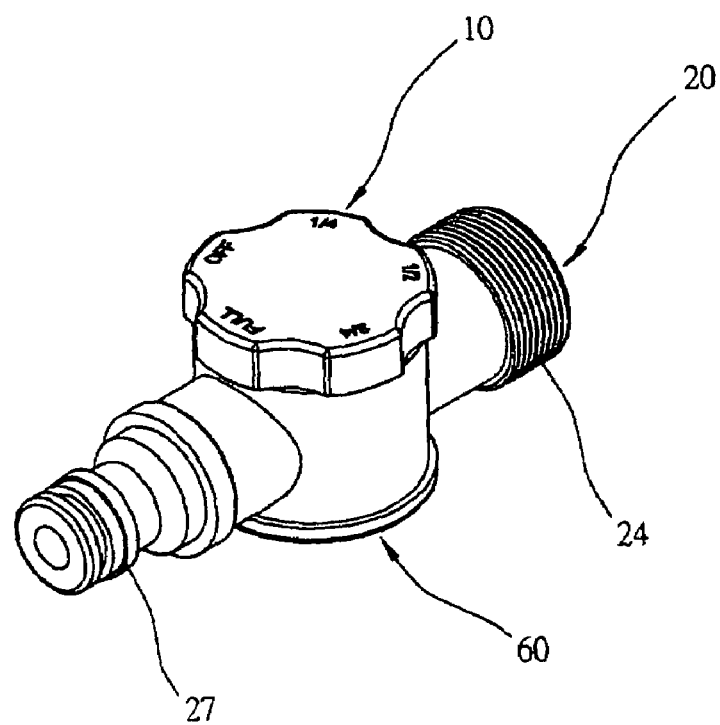
FIG. 1 is a perspective view of a flow control valve in accordance with the preferred embodiment of the present invention.
Figure 2:
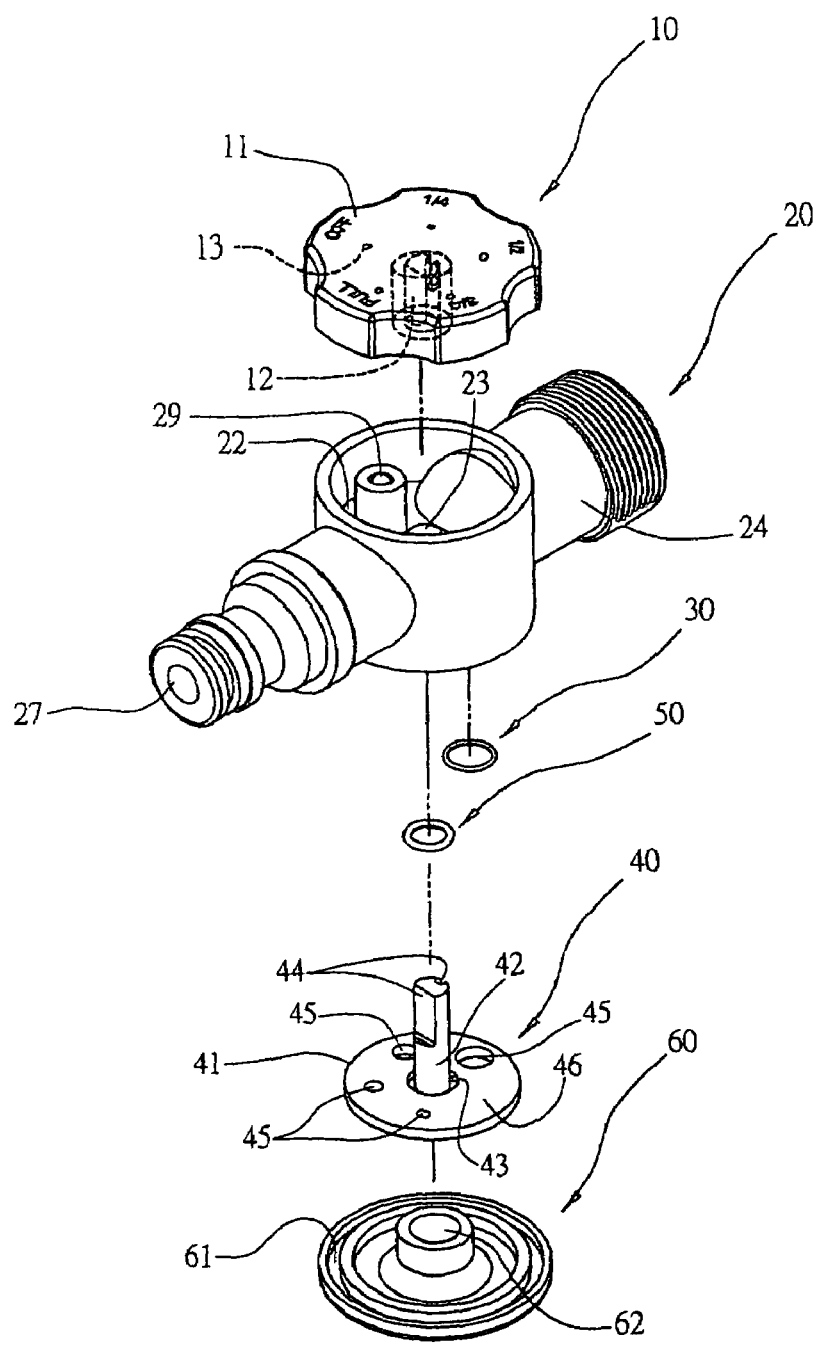
FIG. 2 is an exploded perspective view of the flow control valve as shown in FIG. 1.

Referring to the drawings and initially to FIGS. 1–5, a flow control valve for a gardening pipe in accordance with the preferred embodiment of the present invention comprises a main body 20, a control member 40, a rotation knob 10, and a bottom cap 60.

The main body 20 has a first end formed with a water inlet tube 24 connected to a water source (not shown) and a second end formed with a water outlet tube 27 connected to a sprinkler (not shown) or the like. The main body 20 has a cylindrical mediate portion formed with a valve chamber 21 having a first end formed with a water inlet 25 communicating with the water inlet tube 24 and a second end formed with a water outlet 28 communicating with the water outlet tube 27. The water inlet 25 of the valve chamber 21 of the main body 20 has a periphery formed with an annular groove 26, and an O-ring 30 is mounted in the annular groove 26 of the water inlet 25. The mediate portion of the main body 20 is formed with a baffle 22 located above the valve chamber 21. The baffle 22 of the main body 20 is formed with a through hole 23 communicating with the valve chamber 21. The baffle 22 of the main body 20 has a side provided with a spring biased ball-shaped positioning member 29.

The control member 40 is rotatably mounted in the main body 20 and includes a cylindrical control plate 41 rotatably mounted in the valve chamber 21 of the main body 20, and a control rod 42 having a first end mounted on a central portion of the control plate 41 and a second end extended through and protruded outward from the through hole 23 of the baffle 22 of the main body 20. The control plate 41 of the control member 40 has a periphery formed with a plurality of water outlet holes 45 and a closed water stop portion 46. Preferably, the water outlet holes 45 of the control plate 41 of the control member 40 have different sizes which are successively increased in a gradually incremental manner. The first end of the control rod 42 of the control member 40 is formed with an annular groove 43, and an O-ring 30 is mounted on the control rod 42 of the control member 40 and received in the annular groove 43 of the control rod 42. In addition, the second end of the control rod 42 of the control member 40 is formed with a locking portion 44.

The rotation knob 10 is rotatably mounted on the main body 20 and secured on the control member 40 for rotating the control member 40. The rotation knob 10 is rotatably mounted on a top of the mediate portion of the main body 20 and has a first side secured on the control rod 42 of the control member 40 and a second side formed with a scale face 11. Preferably, the scale face 11 of the rotation knob 10 mates with the water outlet holes 45 and the water stop portion 46 of the control plate 41 of the control member 40 to indicate the water outlet flow rate. The first side of the rotation knob 10 has a protruding central portion formed with an insertion hole 12, and the second end of the control rod 42 of the control member 40 is inserted into the insertion hole 12 of the rotation knob 10. Preferably, the protruding central portion of the rotation knob 10 is locked on the locking portion 44 of the control rod 42 of the control member 40. The first side of the rotation knob 10 has a periphery formed with a plurality of positioning holes 13, and the positioning member 29 of the main body 20 is detachably locked in either one of the positioning holes 13 of the rotation knob 10.

The bottom cap 60 is mounted on the main body 20 and rested on the control member 40 to retain the control member 40 in the main body 20. The bottom cap 60 is secured on a bottom of the mediate portion of the main body 20 and has a side formed with a cylindrical protruding push block 62 extended into the valve chamber 21 of the main body 20 and rested on a bottom of the control plate 41 of the control member 40, so that control plate 41 of the control member 40 is closely rested on the baffle 22 of the main body 20.

Figure 4:
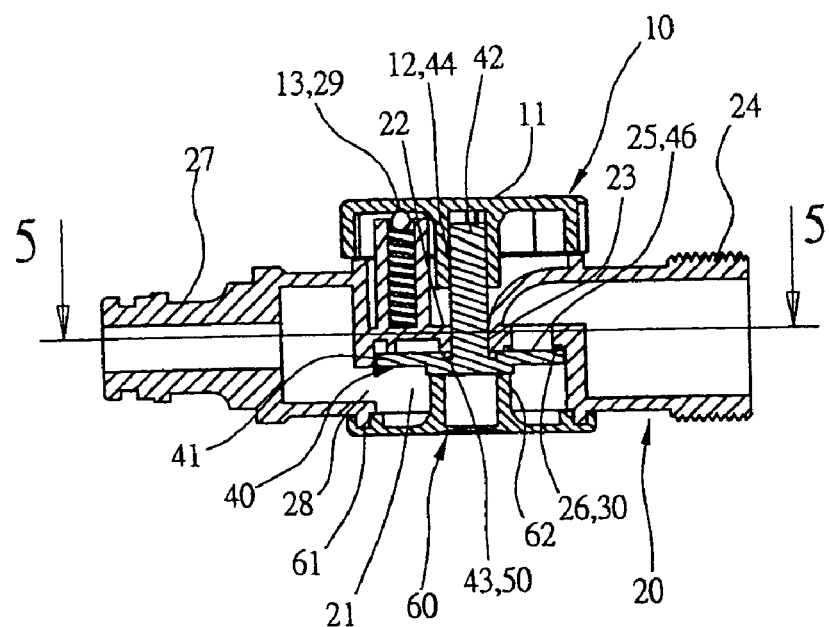
FIG. 4 is a plan cross-sectional view of the flow control valve as shown in FIG. 1.
Figure 5:
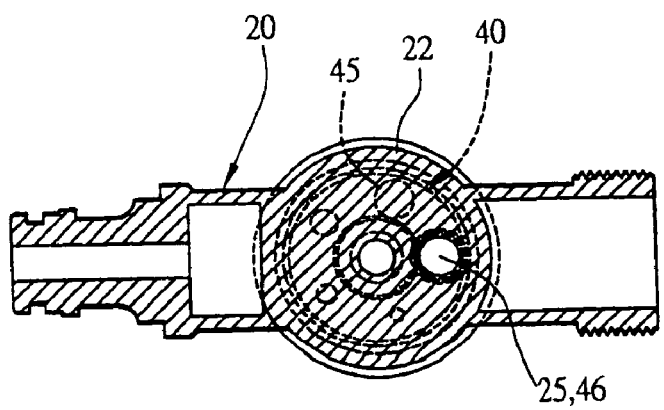
FIG. 5 is a cross-sectional view of the flow control valve taken along line 5—5 as shown in FIG. 4.

As shown in FIGS. 4 and 5, when the rotation knob 10 is rotated, the control rod 42 of the control member 40 is rotated to rotate the control plate 41 of the control member 40, so that the water stop portion 46 of the control plate 41 is moved to align with and block the water inlet 25 of the valve chamber 21, thereby stopping the water flow from the water inlet tube 24.

Figure 6:
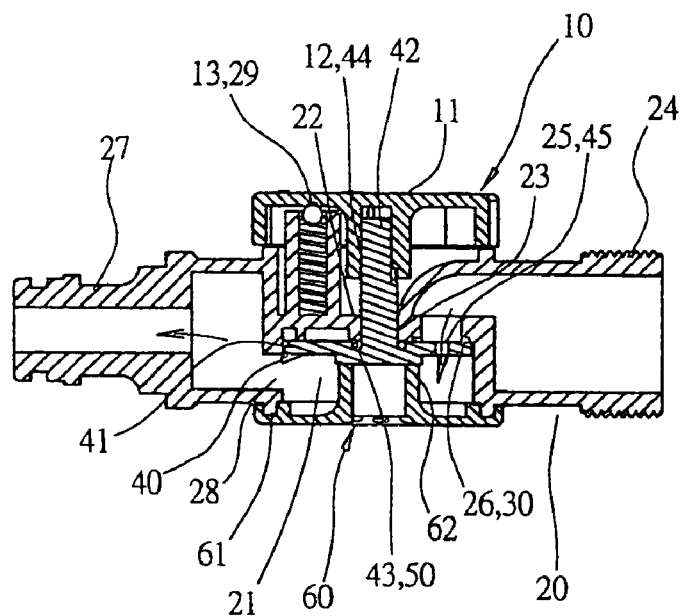
FIG. 6 is a schematic operational view of the flow control valve as shown in FIG. 4.

Alternatively, as shown in FIG. 6, the control rod 42 of the control member 40 is rotated by rotation of the rotation knob 10 to rotate the control plate 41 of the control member 40, so that a smaller water outlet hole 45 of the control plate 41 is moved to align with the water inlet 25 of the valve chamber 21 to allow the water flow having a smaller flow rate to flow from the water inlet tube 24 through the water inlet 25, the valve chamber 21 and the water outlet 28 into the water outlet tube 27 for use.

Figure 7:
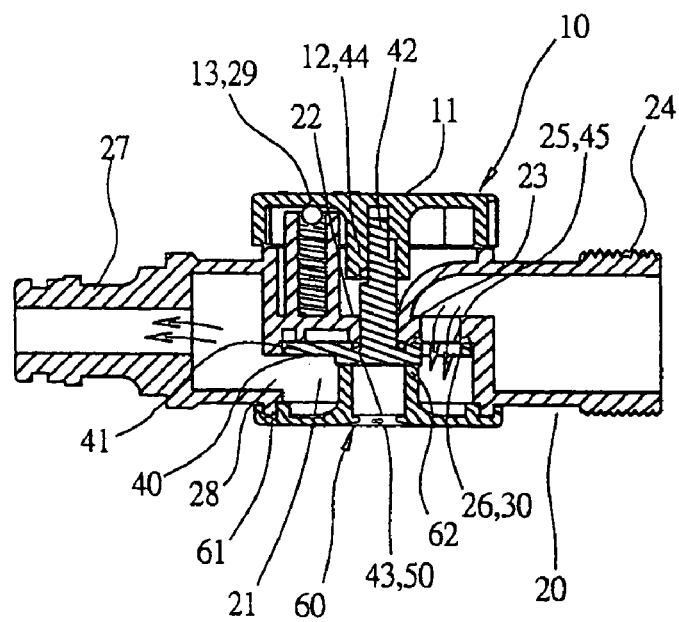
FIG. 7 is a schematic operational view of the flow control valve as shown in FIG. 4.

Alternatively, as shown in FIG. 7, the control rod 42 of the control member 40 is rotated by rotation of the rotation knob 10 to rotate the control plate 41 of the control member 40, so that a larger water outlet hole 45 of the control plate 41 is moved to align with the water inlet 25 of the valve chamber 21 to allow the water flow having a larger flow rate to flow from the water inlet tube 24 through the water inlet 25, the valve chamber 21 and the water outlet 28 into the water outlet tube 27 for use.

Accordingly, the flow control valve has a simplified construction and is made easily, thereby decreasing costs of fabrication. In addition, the water flow rate of the flow control valve is controlled exactly by provision of the water outlet holes 45 having different sizes, thereby facilitating a user operating and controlling the water output the flow control valve.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A flow control valve comprising:
a main body having a first end formed with a water inlet tube, a second end formed with a water outlet tube, and a mediate portion formed with a valve chamber having a first end formed with a water inlet communicating with the water inlet tube and a second end formed with a water outlet communicating with the water outlet tube;
a control member rotatably mounted in the main body and including a control plate rotatably mounted in the valve chamber of the main body, and a control rod having a first end mounted on the control plate and a second end extended through the mediate portion of the main body, the control plate of the control member having a periphery formed with a plurality of water outlet holes and a closed water stop portion which are movable to align with the water inlet of the valve chamber of the main body;
a rotation knob rotatably mounted on the main body and secured on the control member for rotating the control member; and
a bottom cap mounted on the main body and rested on the control member to retain the control member in the main body.

2. The flow control valve in accordance with claim 1, wherein the mediate portion of the main body is substantially cylindrical, and the control plate of the control member is substantially cylindrical.

3. The flow control valve in accordance with claim 1, wherein the water inlet of the valve chamber of the main body has a periphery formed with an annular groove, and the flow control valve further comprises an O-ring mounted in the annular groove of the water inlet.

4. The flow control valve in accordance with claim 1, wherein the mediate portion of the main body is formed with a baffle located above the valve chamber, the baffle of the main body is formed with a through hole communicating with the valve chamber, and the second end of the control rod of the control member is extended through and protruded outward from the through hole of the baffle of the main body.

5. The flow control valve in accordance with claim 4, wherein the control plate of the control member is rested on the baffle of the main body.

6. The flow control valve in accordance with claim 1, wherein the water outlet holes of the control plate of the control member have different sizes.

7. The flow control valve in accordance with claim 1, wherein the first end of the control rod of the control member is formed with an annular groove, and the flow control valve further comprises an O-ring mounted on the control rod of the control member and received in the annular groove of the control rod.

8. The flow control valve in accordance with claim 1, wherein the rotation knob is rotatably mounted on a top of the mediate portion of the main body and has a first side secured on the control rod of the control member and a second side formed with a scale face.

9. The flow control valve in accordance with claim 8, wherein the scale face of the rotation knob mates with the water outlet holes and the water stop portion of the control plate of the control member.

10. The flow control valve in accordance with claim 8, wherein the first side of the rotation knob has a protruding central portion formed with an insertion hole, and the second end of the control rod of the control member is inserted into the insertion hole of the rotation knob.

11. The flow control valve in accordance with claim 10, wherein the second end of the control rod of the control member is formed with a locking portion, and the protruding central portion of the rotation knob is locked on the locking portion of the control rod of the control member.

12. The flow control valve in accordance with claim 8, wherein the first side of the rotation knob has a periphery formed with a plurality of positioning holes, and the mediate portion of the main body has a side provided with a positioning member detachably locked in either one of the positioning holes of the rotation knob.

13. A flow control valve, comprising:

a main body having a first end formed with a water inlet tube, a second end formed with a water outlet tube, and a mediate portion formed with a valve chamber having a first end formed with a water inlet communicating with the water inlet tube and a second end formed with a water outlet communicating with the water outlet tube;

a control member rotatably mounted in the main body and including a control plate rotatably mounted in the valve chamber of the main body, and a control rod having a first end mounted on the control plate and a second end extended through the mediate portion of the main body, the control plate of the control member having a periphery formed with a plurality of water outlet holes and a closed water stop portion which are movable to align with the water inlet of the valve chamber of the main body;

a rotation knob rotatably mounted on the main body and secured on the control member for rotating the control member, the bottom cap is secured on a bottom of the mediate portion of the main body and has a side formed with a cylindrical protruding push block extended into the valve chamber of the main body and rested on a bottom of the control plate of the control member.

\* \* \* \* \*